United States Patent [19]

Graniere et al.

[11] 3,958,270
[45] May 18, 1976

[54] DOCUMENT-MARKING MACHINE

[75] Inventors: Richard C. Graniere, Clifton; Patrick J. Marshall, Verona, both of N.J.

[73] Assignee: Litton Business Systems, Inc., Belleville, N.J.

[22] Filed: Dec. 20, 1971

[21] Appl. No.: 209,970

[52] U.S. Cl. ................................ 360/4; 101/93; 235/61.12 M
[51] Int. Cl.² ...................... G11B 5/00; B41J 45/00
[58] Field of Search ........... 101/66, 93; 346/74 MP; 179/100.2 A; 340/174.1 B, 174.1 G; 235/61.12 M; 360/4

[56] References Cited
UNITED STATES PATENTS

| | | | |
|---|---|---|---|
| 3,343,482 | 9/1967 | Scott et al. | 346/74 MP |
| 3,359,548 | 12/1967 | Yoshii et al. | 340/174.1 B |
| 3,651,503 | 3/1972 | Kowo | 340/174.1 G |
| 3,742,844 | 7/1973 | Arciprete et al. | 101/93 |

*Primary Examiner*—Vincent P. Canney
*Attorney, Agent, or Firm*—Norman Friedman; Stephen A. Roen; Robert F. Rotella

[57] ABSTRACT

Machine for marking documents with visually readable printed information on one portion of the document, and with magnetically encoded information on another, magnetizable portion of the document. The magnetically encoded information is read to determine if it was recorded with an error. If it was, printing is prevented so that a document which has an error in the magnetically recorded information is presented as a blank, non-printed document. It is therefore readily apparent that the document is defective and should not and cannot be used.

12 Claims, 7 Drawing Figures

3,958,270

DOCUMENT-MARKING MACHINE

CROSS-REFERENCE TO RELATED APPLICATION

Application Ser. No. 83,901 filed Oct. 26, 1970, and assigned to the same assignee as the present application is directed to documents of the type which the present machine is adapted to mark.

BACKGROUND OF THE INVENTION

It has long been customary to affix to merchandise a document which has printed thereof information such as price, stock classification, and other desired information. Recently, there have been developed documents which, in addition to containing the foregoing printed information, are also provided with a magnetizable portion on which is magnetically encoded some or all of the foregoing printed information, plus, if desired, additional information to be used in control of the merchandising operation.

The present invention relates to a machine for marking such documents with both the printed information and also the magnetically encoded information.

In such machines it is desirable that there be provided means for error detection to determine whether the magnetically encoded information, which is of course invisible, has been recorded correctly or not. If an erroneous recording is detected, the erroneously recorded document as operated on by the machine nevertheless has had applied to it the printed information, but some additional error indication is also printed on the document -- either as a color coded mark or a legend of some sort indicating that the document should not be used. However, the printed error indication may be overlooked by the machine operator or other clerical personnel involved in the process of making the documents or applying them to the merchandise. Also, the ink supply for the errorindicating printing means may run dry so that the erroneous document does not contain the error indication. It will therefore be seen that a document marked by the foregoing type of machine may nevertheless be inadvertently applied to the merchandise even though it contains incorrectly recorded magnetic information.

SUMMARY OF THE INVENTION

In accordance with the present invention, there is provided a document-marking machine arranged to magnetically encode data on the document and also print the information thereon. Before printing, however, the magnetically recorded data is read from the document to determine if it contains an error. If an error is detected, the data printing means is prevented from operating so that the document will be blank. Anyone seeing this blank, i.e., non-printed, document is thus at once made aware that the document should not and cannot be used, thereby eliminating the danger that an erroneously magnetically recorded document will be applied to the merchandise.

The invention offers the further advantage of eliminating the need for additional error - indicating printing means.

BRIEF DESCRIPTION OF THE DRAWINGS

FIG. 3 is a fragmentary front elevational view of the machine.

DESCRIPTION OF THE PREFERRED EMBODIMENT

Figure 1:
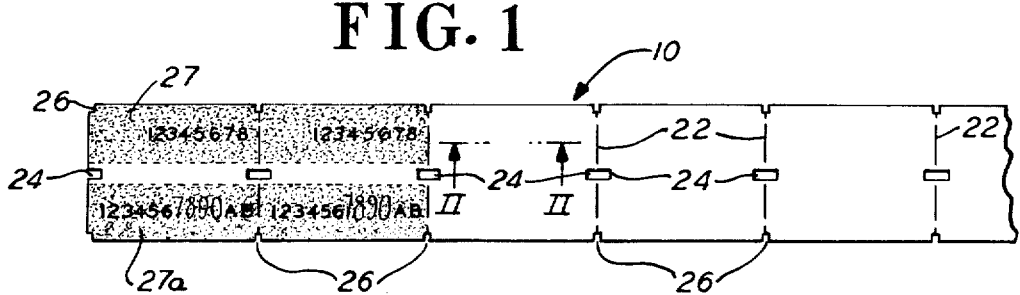
FIG. 1 is a top plan view of the tag web to be marked by the machine.
Figure 2:
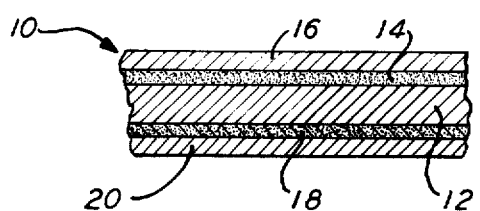
FIG. 2 is an enlarged fragmentary sectional view taken on line II—II of FIG. 1.

FIGS. 1 and 2 show in stock web form the tags which are to be marked by the machine of the present invention. The tag web 10 includes a base layer 12 and an overlying layer 14 of any suitable magnetic oxide or other magnetizable material adapted to have data encoded thereon by selective magnetization and nonmagnetization of areas thereof. The magnetizable layer 14 underlies an outermost layer 16 adapted to have printed thereon visually readable printed data. The outermost print-receiving layer is a thin layer of any suitable material, such as paper, whose characteristics and thickness are such that the encoded data can be recorded on and read from the magnetizable layer through the printreceiving layer 16.

Underlying the base layer 12 is a layer 18 of any suitable, e.g., pressure sensitive, adhesive whereby the tags can be affixed, in the manner of a label, to any desired article of merchandise or the like. A conventional releasable backer or lining strip 20 covers the adhesive 18 until the tag is to be applied to the merchandise. The tag web 10 described above is provided with equally spaced lines of weakening 22, each transverse pair of the weakening lines defining therebetween an individual tag or label which can be torn from the web.

The tag web is provided with longitudinally spaced rectangular sprocket holes 24 each extending across one of the lines of weakening 22, by which the web can be fed through the machine.

Narrow, inwardly extending opposed notches 26 are provided at the opposed ends of each line of weakening 22. As described later, suitable photoelectric sensing means senses the notches to determine the passage of each tag length past a given reference point in the machine and thereby suitably controls various machine functions.

As shown by the left-most tag of FIG. 1, the tagmarking machine of the present invention is adapted to print two longitudinal lines or channels of printed data on the outermost layer of the tag and to record magnetic data in the two upper and lower longitudinal field areas shown in broken lines and identified as 27 and 27a, respectively. It should be understood, however, that the magnetic oxide layer 14, as well as the other layers of the tag web, occupy the full length of width of the tag. If desired, however, the magnetic oxide layer can be in the form of discrete stripes rather one continuous overall layer.

It should further be noted that the broader principles and features of the present invention are applicable irrespective of the number of channels employed for recording, whether more or less than two.

The tag stock may be supplied for marking thereof by the tag-marking machine in any suitable form, e.g., as a roll or fan-folded.

Figure 4:
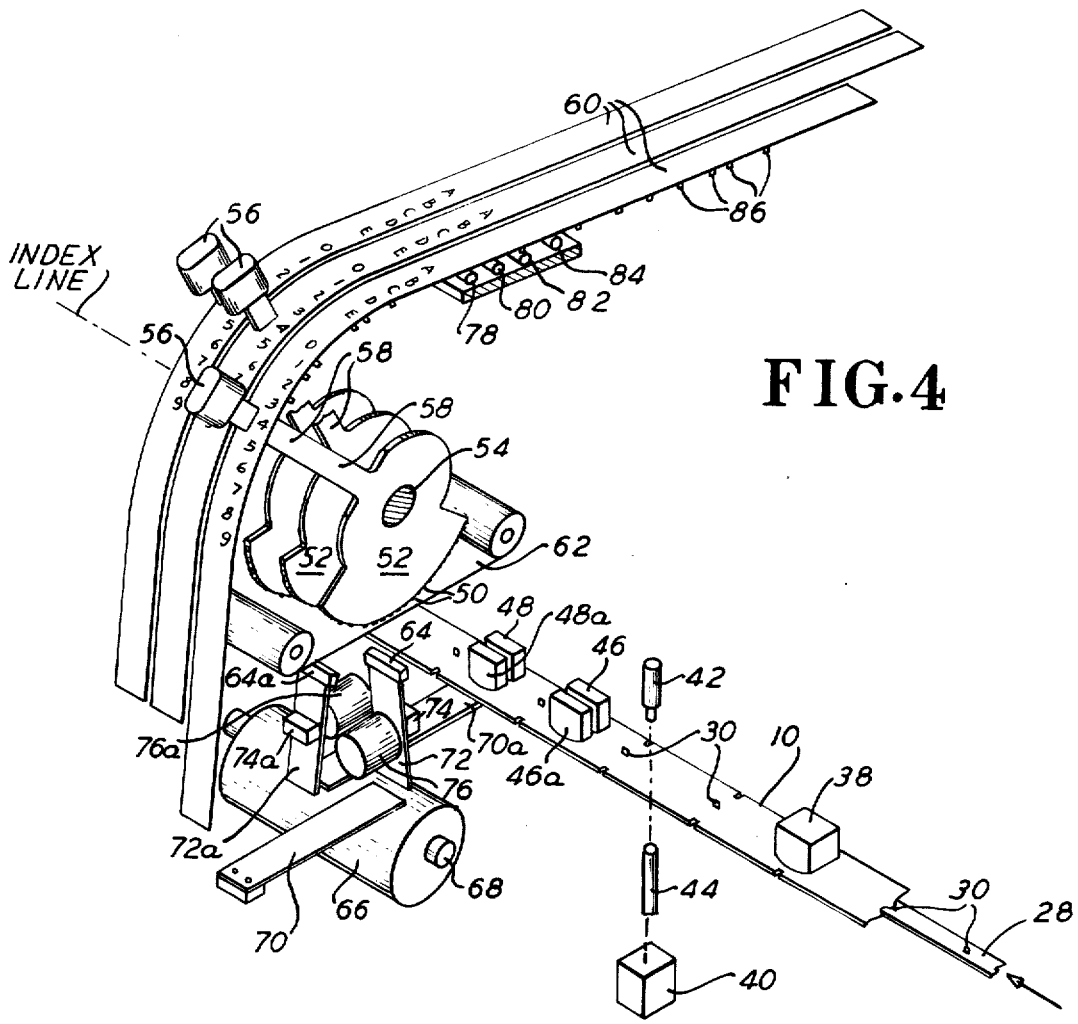
FIG. 4 is a fragmentary front perspective view of the machine.

The tag-marking machine will now be described. Referring particularly to FIGS. 3 and 4, it includes a number of longitudinally spaced base plates 29, 31, and 33 defining a feed path along which the tag web is to be fed from right to left by an elastomeric drive belt 28 having sprocket teeth 30 adapted to extend through the sprocket holes 24 of the web to feed it.

The sprocket belt 28 is entrained over pulleys 32 and 34 and is driven by a motor 36 which drives pulley 34 counterclockwise.

The tag web first passes under a magnetic erase head 38 which is always energized whenever the machine is turned on. Erase head merely serves to remove any extraneous data or other undesired magnetized condition of the tag magnetizable layer 14, so as to present a "fresh" magnetic layer for the magnetic recording thereon.

The tag stock next passes between a photosensitive transducer, for example a phototransistor, 40 and a light source 42 adapted to illuminate the transducer through a fiber optic light pipe 44. Normally, the full width of the tag stock will block the light from falling on the light pipe. However, the light will be permitted to shine through whenever a tag notch 26 is encountered. The resultant notch-indicating signals from phototransducer 40 consequently are an indication of passage of successive tag lengths through the machine. These signals can be used in any suitable way to control the timing of the various machine functions.

Traveling toward the left, the tag web next passes beneath the magnetic recording heads 46 and 46a each for recording respectively on the aforedescribed upper and lower channels 27 and 27a of the magnetizable layer 14 of the tags.

From the magnetic recording heads 46, 46a the tag web travels to upper and lower magnetic reading heads 48, 48a, adapted to read from the tag the data which has been magnetically encoded thereon by the respective recording heads. As will be described in greater detail later, the purpose of this magnetic reading operation is to determine whether the recording means correctly recorded the magnetic data or whether the magnetically recorded data contains an error. If recording was correctly done, the tag will be printed on at the next downstream station but if an error is detected, printing is inhibited so that the tag will be blank thereby clearly indicating that the tag should not and cannot be used.

From the magnetic reading means 48, 48a, the tag stock continues leftwardly to the tag printing station. The printing means at the printing station comprises a number of arcuate printing sectors each having along its outer arcuate periphery different printing type faces 50. One group 52 of the sectors is arranged to print the upper line of characters on the tags; and another group 52a (FIG. 3) prints the lower line of characters. All the printing sectors are mounted for rotation about a fixed shaft 54.

Each type sector 52 and 52a is adapted to be manually selectively or rotatably set by a keyboard for printing from any type face 50 thereof on the tag web. The keyboard comprises a side by side array of keys 56, one for each of the printing sectors 52 and 52a. Each key 56 is rigidly connected to its associated printing sector by an elongated key stem or lever 58. Each key lever extends through and moves with itself a respective associated flexible, non-magnetic setting band 60. Band 60 is constrained by suitable guide structure to slide along the path corresponding to the shape of the band as shown in FIG. 4, i.e., at its upper and lower end portions linearly horizontally and vertically, but intermediate thereof along a circular path having as its axis or center shaft 54. Each band is provided with externally visible indicia corresponding to the type faces of the associated type sector 52 or 52a. The desired type face character is selected for printing by moving the related key 56 up or down so that the visible index character on the band is aligned with an index line on the keyboard.

It will be understood that there is provided for each printed character position on the tag a corresponding printing sector 52, 52a, and key 56 and setting band 60 associated therewith.

In a manner to be described shortly, the setting of the keys 56 is also effective to condition the electric circuitry of the machine so that the magnetic recording heads 46, 46a will magnetically encode on the tag stock the data corresponding to the setting of the keys.

Printing is effected on the tag stock by means of an inked printing ribbon 62 interposed between the tag web 10 and the printing sectors 52, 52a, as follows. There are provided two vertically movable type hammers 64, 64a, each respectively for cooperation with the upper and lower printing sectors 52, 52a, which they underlie. The printing actuating means comprises an eccentric roller 66 rotatably driven about an axis defined by shaft 68. As the eccentric roller 66 rotates, it will cause the free ends of the two cantilever leaf springs 70, 70a riding thereon to raise and lower. Downwardly extending ferromagnetic, magnetizable extensions 72, 72a of the type hammers are normally held by respective permanent magnets 74, 74a, out of the vertical oscillating path of movement of the cantilever leaf springs 70, 70a. When it is desired to print, respective print control solenoids 76 and 76a, each respectively cooperatively associated with the ferromagnetic depending extensions of the associated hammer 72 or 72a, are energized to attract the hammer extensions away from the associated permanent magnet and into the upward path of movement of the associated cantilever leaf spring 70 or 70a. Therefore, when the eccentric roller 66 drives the leaf springs upwardly, they in turn will drive the overlying hammers upwardly to press the tag stock firmly against the selected type face of the printing sector 52 or 52a with the inked ribbon interposed therebetween, whereby printing will occur.

Figure 5:
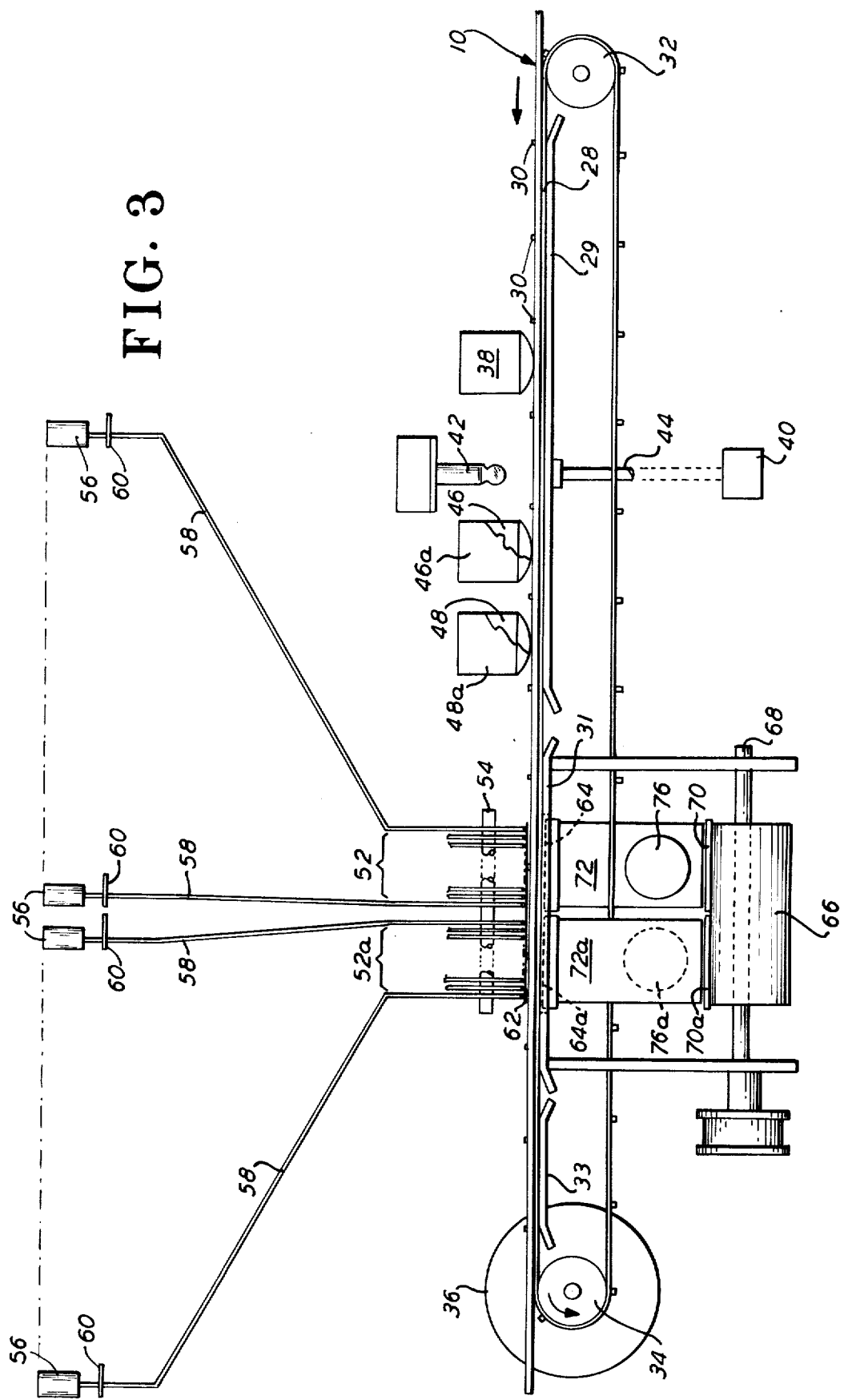
FIG. 5 is a schematic side elevational view of the manually controlled settable means for selecting the data characters to be marked on the tag.

Associated with and closely underlying each setting band 60 in a series of four conventional, sealed, read switches 78, 80, 82, 84, adapted to be energized in unique, different binary code combinations. There is a separate set of such reed switches associated with each setting band 60. Each code combination corresponds uniquely to each character setting of key 56 and setting band 60. This combinational code for selective energizing of the reed switches is controlled by a number of permanent magnets 86 carried on the underside of each nonmagnetic setting band 60. As shown in FIG. 5, the permanent magnets are so positioned along the length of the band that for any given selected set position of the band, a different combination of the magnets 86 will overlie the four reed switches and thereby correspondingly energize the latter in a different combination for each character.

Figure 6:
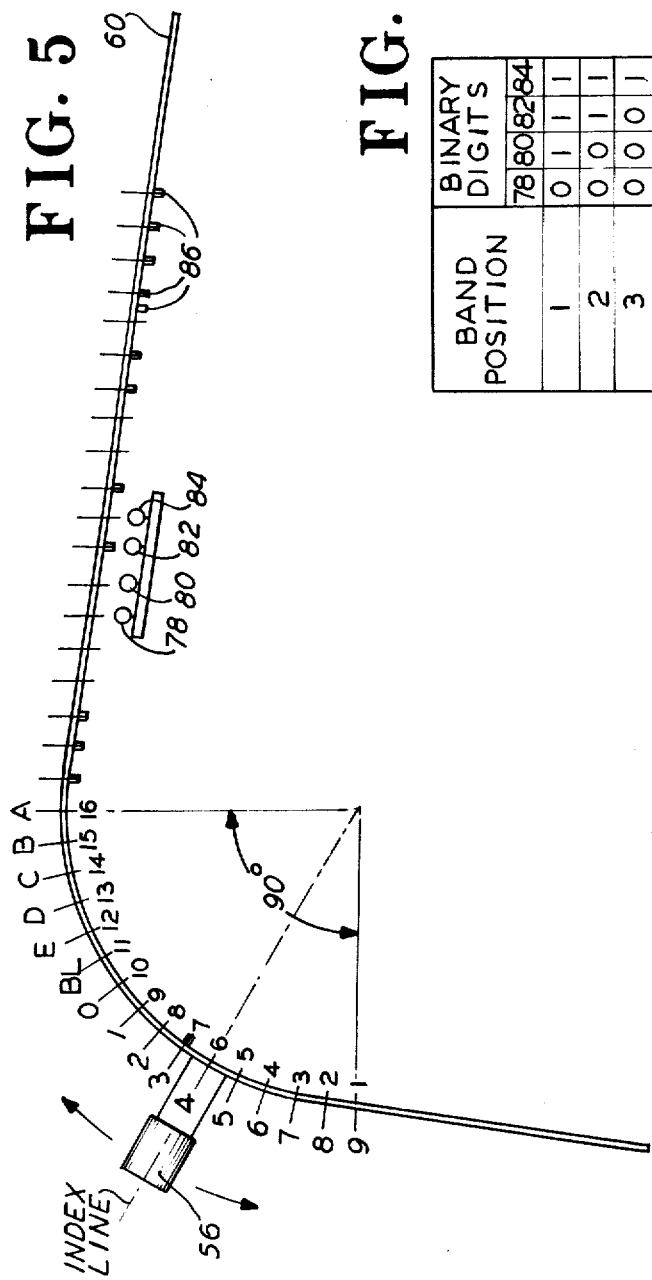
FIG. 6 is a table showing the different reed switch code combinations for the various selectable data characters.

The table of FIG. 6 shows the various binary code read switch energized combinations for different characters selectable by shifting the setting band 60 under control of key 56. In the present machine, as shown in FIGS. 5 and 6, there are 16 such different selectable character positions, but the number of characters or what they specifically are is a matter of choice.

Figure 7:
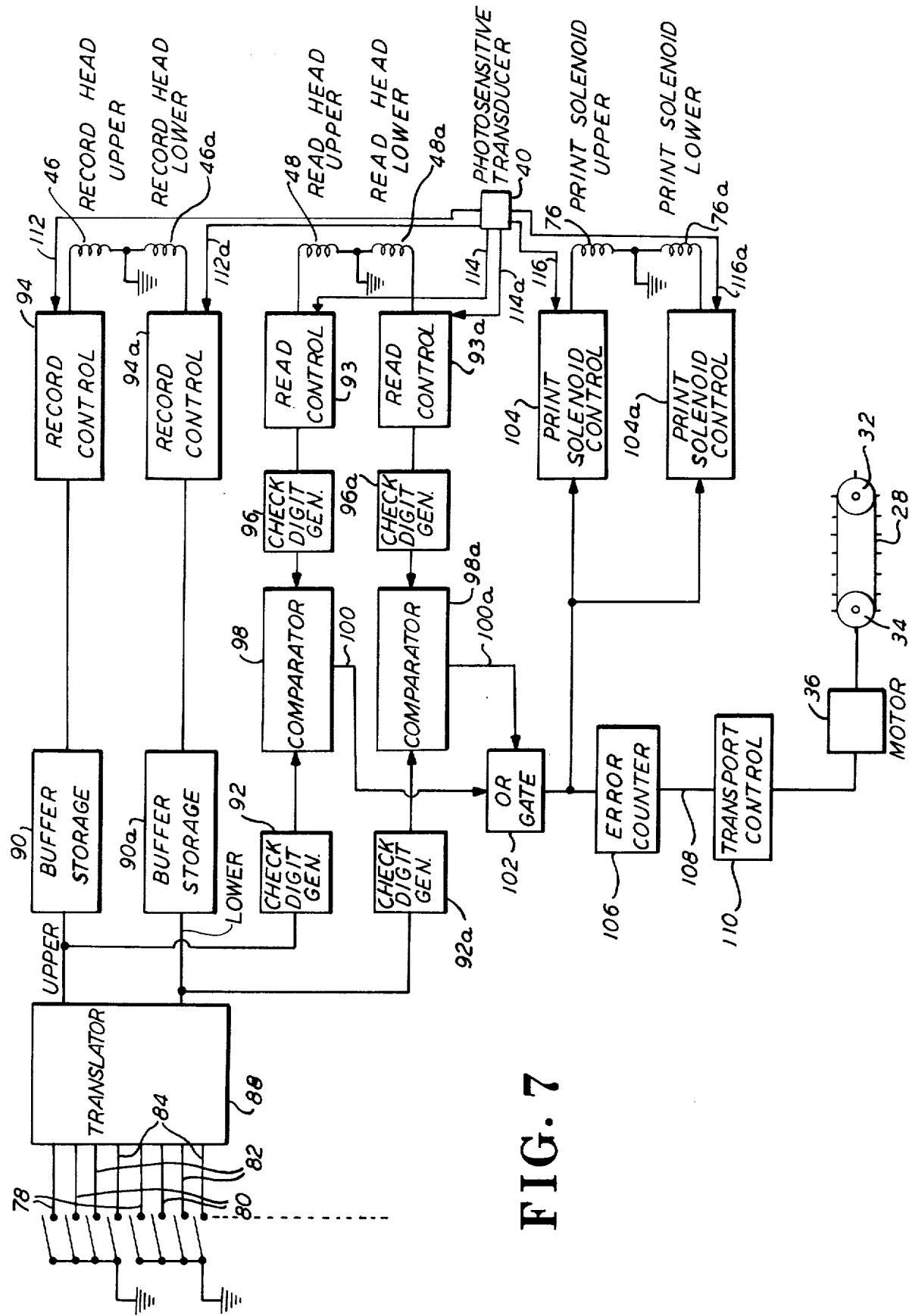
FIG. 7 is a schematic circuit diagram of the electrical control circuitry of the machine.

The electrical control circuitry of the machine will now be described. Referring to FIG. 7, the outputs of all the sets of aforedescribed reed switches 78–84 are connected to a translator 88 which converts the data which had been set on the keyboard from the reed switch binary code combinations of FIG. 6 to any other code, for example, binary coded decimal, desired for the magnetic encoding of that information on the tag web by the recording heads 46, 46a. The information outputted from translator 88 is transmitted to a buffer storage 90 and also to a check digit generator 92. The latter generates a check digit based on the information stored in the buffer storage 90 in accordance with any desired check digit formula. The information stored in buffer storage 90, under control of conventional recording control logic 94, controls magnetic recording head 46 to record the information magnetically on the magnetizable layer 14 of the tag web 10.

It will be recalled that the information so magnetically recorded on each tag is then read by the magnetic reading head 48. The operation of the latter is controlled by reading control 93 in conventional fashion. The information sensed by the reading head is transmitted to another check digit generator 96 operable to generate the check digit for the read information in accordance with the same formula as the first check digit generator. The check digit outputs of the two check digit generators 92 and 96 are fed to opposite sides of a comparator 98 to determine whether the check digit generated by 92 is the same as the check digit generated by 96.

If they are not the same, this lack of coincidence will cause a signal to be outputted from the comparator on line 100, and this signal is employed to prevent the printing means from operating to print on the tag.

As described earlier, the tag is printed and magnetically encoded on two spaced longitudinal lines or channels 27 and 27a (FIG. 1); and for this purpose there are provided printing members 52 and 52a for respectively printing on the upper and lower lines, there also being a separate manually settable selector key 56, associated setting band 60, magnets 86, and reed switches 78–84 for each such printing member. Also, there are two separate record heads 46, 46a and read heads 48, 48a, each pair respectively for the upper and lower channels of magnetic recording on the tag.

As shown in the circuit diagram of FIG. 7, the circuit arrangement previously described is provided in parallel for the upper and lower channel magnetic heads and for the upper and lower printing control solenoids 76, 76a. In FIG. 7, the components for the upper channel are designated by the previously used reference numerals, while the corresponding parallel components for the lower channels are designated by the same numerals but with the letter *a* added.

If either check digit comparator 98 or 98a detects a mismatch between the outputs of check digit generators 92 and 96 or 92a and 96a, that comparator sends a signal over line 100 or 100a to an OR gate 102 to which both comparators are connected. The output of the OR gate is connected to the control circuitry 104 and 104a for the upper and lower printing solenoids 76, 76a, which is effective to control the solenoids, and therefore the printing operation, in any suitable conventional manner. Normally, that is in the absence of an error indication, the solenoid control circuitry will cause the solenoids 76, 76a to be energized at the appropriate time, whereby the hammer extensions will be drawn away from permanent magnets 74, 74a into the path of leaf springs 70, 70a and will therefore be driven upwardly by eccentric roller 66 to cause printing.

However, a signal outputted from the OR gate 102, thus indicating an error detected by either of comparators 100 or 100a, controls the print solenoid control circuitry to prevent the solenoids from operating. As a result, the hammer extensions will not be attracted by the solenoids into the path of movement of leaf springs 70, 70a, and therefore printing will not occur. Hence, the tag will be blank.

If desired, the output of OR gate 102 can also be connected to an error accumulating counter 106 effective when a given number of errors have been registered to itself output a signal on line 108. The latter signal may be used in any desired fashion to suspend or otherwise control further operation of the machine. For example, the signal output of the error accumulating counter 106 may be used to control the circuitry 110 controlling the operation of the tag feed drive motor 36 which drives the tag feed belt 28, to prevent further feeding of the tab web 10. In like fashion, the output of error counter 106 can be used for inhibiting any other machine functions.

It will be understood that the check digit generated by the check digit generator 92 or 92a is not magnetically recorded on the tag but rather is inputted to comparator 98 or 98a for comparison with the check digit generated by check digit generator 96 or 96a. Thus, magnetic recording space on the tag which would otherwise be occupied by the check digit is available for recording other, directly pertinent data it is desired to record.

The timing of the various operations, e.g., recording, reading, and printing (or non-printing) operations, to occur at the appropriate times relative to the feeding movement of the tag web can be controlled in any suitable manner. For example, it will be recalled that the photosensitive transducer 40 senses the passage through the machine of each tag length. Therefore, as shown in FIG. 7, the output of this transducer can be connected to the control circuitry for these various functions to control the timing thereof. Thus, for this purpose the output of the transducer is connected by lines 112 and 112a to record control circuits 94 and 94a, by lines 114 and 114a to read control circuits 93 and 93a, and by lines 116 and 116a to the print solenoid control circuits 104 and 104a.

It should be understood that the term "error" as used in the present specification and claims is also intended to include situations where the magnetic recording means 46 or 46a fails to record the encoded information properly, whether by omitting to record all or part of the information or by providing only marginally readable recorded signals.

While there has been shown and described one embodiment of the invention, it will be understood that the various principles and features of the invention can be practiced in numerous other specific forms. Accordingly, it is intended that the foregoing disclosure be illustrative only and not in any way limitative of the following claims.

We claim:

1. A machine for marking documents, said documents being adapted to have encoded data recorded thereon, and also being adapted to receive visually readable printing, said machine comprising:
    a recording station including recording means for recording said encoded data on said documents;
    a printing station including printing means for printing visually readable printed data on said documents, at least portions of said visually readable printed data and said encoded data being identical with one another;
    error detection means for determining whether the encoded data has been correctly recorded on said documents by said recording means, said error detection means including reading means for reading from the documents the data which has been encoded thereon by said recording means; and
    means responsive to detection of an error by said error detection means for preventing said printing means from printing said printed data on said document.

2. The combination according to claim 1, including:
    means defining a feed path along which said documents are adapted to be fed;
    said recording, reading, and printing means being located along said feed path.

3. The combination according to claim 2, wherein:
    said printing means is located downstream of said recording and reading means relative to said feed path.

4. The combination according to claim 1, wherein:
    said documents include a portion of magnetizable material, said encoded data being magnetically recorded on said magnetizable material; and
    said recording means and reading means are magnetic recording means and magnetic reading means respectively.

5. The combination according to claim 4, including:
    means defining a feed path along which said documents are adapted to be fed;
    said magnetic recording, magnetic reading, and printing means being located along said feed path.

6. The combination according to claim 5, wherein: said printing means is located downstream of said recording and reading means relative to said feed path.

7. The combination according to claim 1, wherein said error detection means includes:
    means for generating a first error control indication corresponding to the encoded data to be recorded by said recording means;
    means controlled by said reading means for generating a second error control indication corresponding to said encoded data as read by said reading means; and
    comparator means for comparing said first and second error control indications.

8. The combination according to claim 7, wherein:
    said first and second error control indications each comprises a check digit.

9. The combination according to claim 4, wherein said error detection means includes:
    means for generating a first error control indication corresponding to the encoded data to be recorded by said recording means;
    means controlled by said reading means for generating a second error control indication corresponding to said encoded data as read by said reading means; and
    comparator means for comparing said first and second error control indications.

10. The combination according to claim 9, wherein:
    said first and second error control indications each comprises a check digit.

11. The combination according to claim 1, wherein:
    said printing means includes printing members, hammer means therefor, and actuating means for said hammer means;
    said error detection means being effective to prevent actuation of said hammer means by said actuating means in response to detection of an error by said error detection means.

12. The combination according to claim 4, wherein:
    said magnetizable portion of said documents underlies the printing-receiving portion thereof;
    said magnetic recording and magnetic reading means being operable to respectively record and read through said printing-receiving portion of said documents.

* * * * *